(12) United States Patent
Shim

(10) Patent No.: US 7,240,884 B2
(45) Date of Patent: Jul. 10, 2007

(54) MOUNTING DEVICE OF SPRINKLER

(75) Inventor: Dae-Min Shim, Seoul (KR)

(73) Assignee: Paradise Industry Co., Ltd., Bucheon, Gyeonggi-Do (KR)

( * ) Notice: Subject to any disclaimer, the term of this patent is extended or adjusted under 35 U.S.C. 154(b) by 195 days.

(21) Appl. No.: 11/019,374

(22) Filed: Dec. 22, 2004

(65) Prior Publication Data

US 2005/0139743 A1    Jun. 30, 2005

(30) Foreign Application Priority Data

Dec. 24, 2003    (KR)    ...................... 10-2003-0096849

(51) Int. Cl.
*B42F 13/00*    (2006.01)

(52) U.S. Cl. ................... 248/342; 248/343; 248/200.1; 248/201; 248/62; 248/65; 248/75; 248/48.1; 248/74.1; 52/220.6; 52/506.06; 52/506.07; 52/506.08; 24/292; 24/295; 403/231; 403/346; 403/403

(58) Field of Classification Search ................ 248/342, 248/343, 200.1, 201, 62, 65, 75, 48.1, 74.1; 52/220.6, 506.06, 506.07, 506.08; 24/292, 24/295; 403/231, 346, 403

See application file for complete search history.

(56) References Cited

U.S. PATENT DOCUMENTS

| 4,723,749 A | * | 2/1988 | Carraro et al. | ............... 248/317 |
| 6,260,810 B1 | * | 7/2001 | Choi | ........................... 248/65 |
| 6,280,810 B1 | | 8/2001 | Nakamura et al. | |

* cited by examiner

*Primary Examiner*—Carl D. Friedman
*Assistant Examiner*—Nkeisha J. Dumas
(74) *Attorney, Agent, or Firm*—Cohen Pontani Lieberman & Pavane LLP

(57) ABSTRACT

A mounting device of a sprinkler comprises: a main body provided with a pair of side plates and an upper plate disposed on upper portions of the side plate; a rail mounting portion formed at lower ends of the side plates and insertedly fixed to a support rail; a support bar fixing portion formed at an upper side of the main body, for supporting the support bar; and a locking member inserted in the side plates in a lateral direction, for preventing the rail mounting portion from being separated from the support rail.

9 Claims, 7 Drawing Sheets

MOUNTING DEVICE OF SPRINKLER

BACKGROUND OF THE INVENTION

1. Field of the Invention

The present invention relates to a mounting device of a sprinkler, and particularly, to a mounting device of a sprinkler capable of facilitating an operation for mounting a sprinkler to a ceiling and of reducing the time taken to carry out the operation.

2. Description of the Background Art

In general, the sprinkler includes a sprinkler reducer mounted inside a ceiling; a sprinkler head mounted to a lower end of the sprinkler reducer and disposed to be exposed to the outside of the ceiling, for spraying of water for fire protection; and a water supply hose connected to an upper end of the sprinkler reducer, through which water needed for fire protection is supplied.

Here, the sprinkler reducer is mounted to an inner surface of the ceiling by a mounting device of a sprinkler.

The mounting device of the sprinkler in accordance with the conventional art includes: a pair of ceiling support rails fixed to an inner surface of the ceiling parallel to each other; a reducer support beam mounted between the ceiling support rails; a mounting device installed between the ceiling support rail and the reducer support beam, for fixing the support beam to the reducer support rail; and a fixing bracket for fixing the sprinkler reducer to the reducer support beam.

As seen in U.S. Pat. No. 6,260,810, the mounting device in accordance with the conventional art is disadvantageous in that an assembling operation is complicated and the time taken to carry out the operation is lengthened because of threading of locking bolts for fixing the mounting device to the ceiling support rail and to the reducer support beam.

Particularly, the two locking bolts are threaded in perpendicular directions to each other, which makes the assembling operation more complicated.

SUMMARY OF THE INVENTION

Therefore, an object of the present invention is to provide a mounting device of a sprinkler which can facilitate an assembling operation and reduce the time taken to carry out the operation and which can be used for various sized ceiling support rails and sprinklers.

To achieve these and other advantages and in accordance with the purpose of the present invention, as embodied and broadly described herein, there is provided a mounting device of a sprinkler comprising: a pair of support rails fixed on a ceiling parallel to each other; a support bar fixed between the support rails; a mounter for fixing the support bar and the support rail together; and a mounting bracket for fixing the sprinkler reducer to the support bar, wherein the mounter comprises: a main body provided with a pair of side plates and an upper plate disposed on upper portions of the side plates; a rail mounting portion formed at lower ends of the side plates and insertedly fixed to the support rail; a support bar fixing portion formed at an upper side of the main body, for supporting the support bar; and a locking member inserted in the side plates in a lateral direction, for preventing the rail mounting portion from being separated from the support rail.

The rail mounting portion comprises: a stopping projection bent inward at lower ends of the side plates, and inserted into and caught by the mounter fixing portion of the support rail; and a contact portion bent downward at both end portions of the stopping projection and coming in contact with both sides of a rail portion of the support rail.

The locking member comprises: a first plate having a pair of slots which are inserted in the side plates, respectively; and second plates extending vertically from both sides of the first plate, for supporting a lower surface of the support bar.

To achieve these and other advantages and in accordance with the purpose of the present invention, as embodied and broadly described herein, there is provided a mounting device of a sprinkler comprising: a main body including a pair of side plates having a through hole in which a support bar is inserted and a groove, and an upper plate disposed on the side plates; a rail mounting portion bent inward at lower ends of the side plates and fixed to a mounter fixing portion of a support rail; a locking bolt coupled to an upper plate of the main body, for fixing the support bar; and a locking member including a first plate having a pair of slots inserted into the groove of the side plates, and second plates extending upward from both sides of the first plate, the second plate for supporting a lower surface of the support bar.

It is set that $h > h_1 + (h_2 - h_3)$, $H_1 > (h_2 - h_3)$, and $H_2 > (h_2 - h_3) + h_4$ on the assumption that a height of the through hole is referred to as 'h', a height of the groove '$H_1$', a height of the second plate of the locking member '$H_2$', a height of the support bar '$h_1$', the maximum height of mounter fixing portions of various sized support rails '$h_2$', the minimum height of mounter fixing portions of support rails '$h_3$', and a height between the through hole and the groove '$h_4$'.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

There may exist a plurality of embodiments of a mounting device of a sprinkler in accordance with the present invention, and the most preferred embodiments will be explained.

Figure 1:
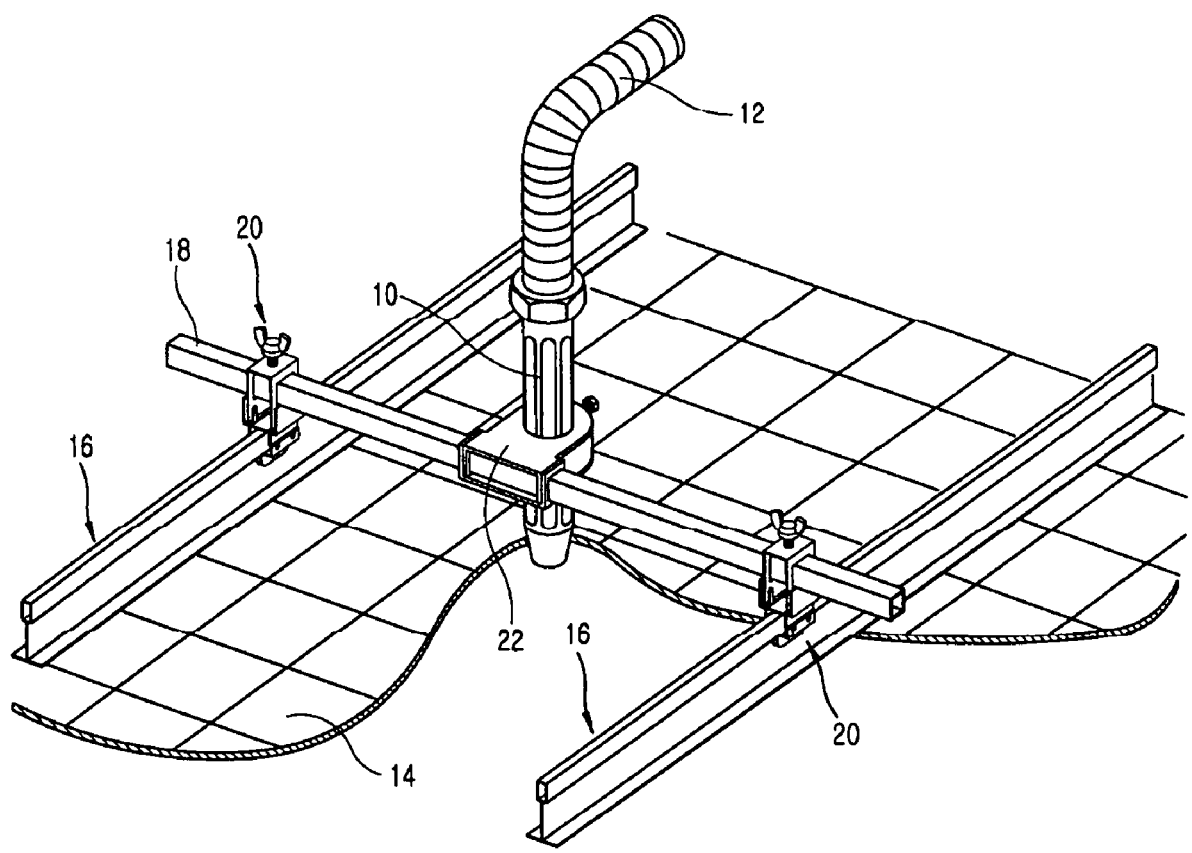
FIG. 1 is a perspective view of a mounting device of a sprinkler in accordance with a first embodiment the present invention.
Figure 2:
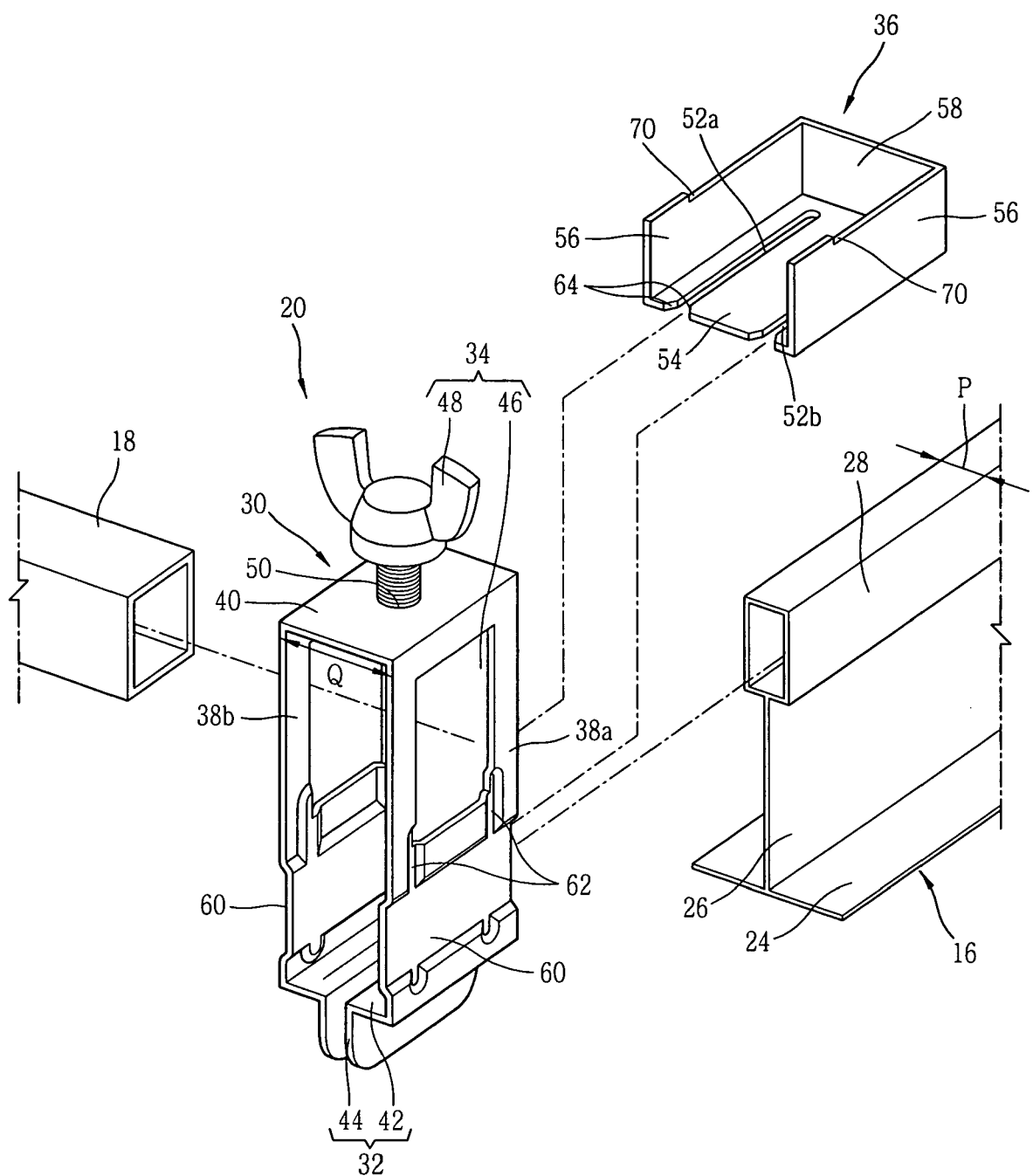
FIG. 2 is an exploded perspective view of the mounting device of the sprinkler in accordance with a first embodiment the present invention.
Figure 3:
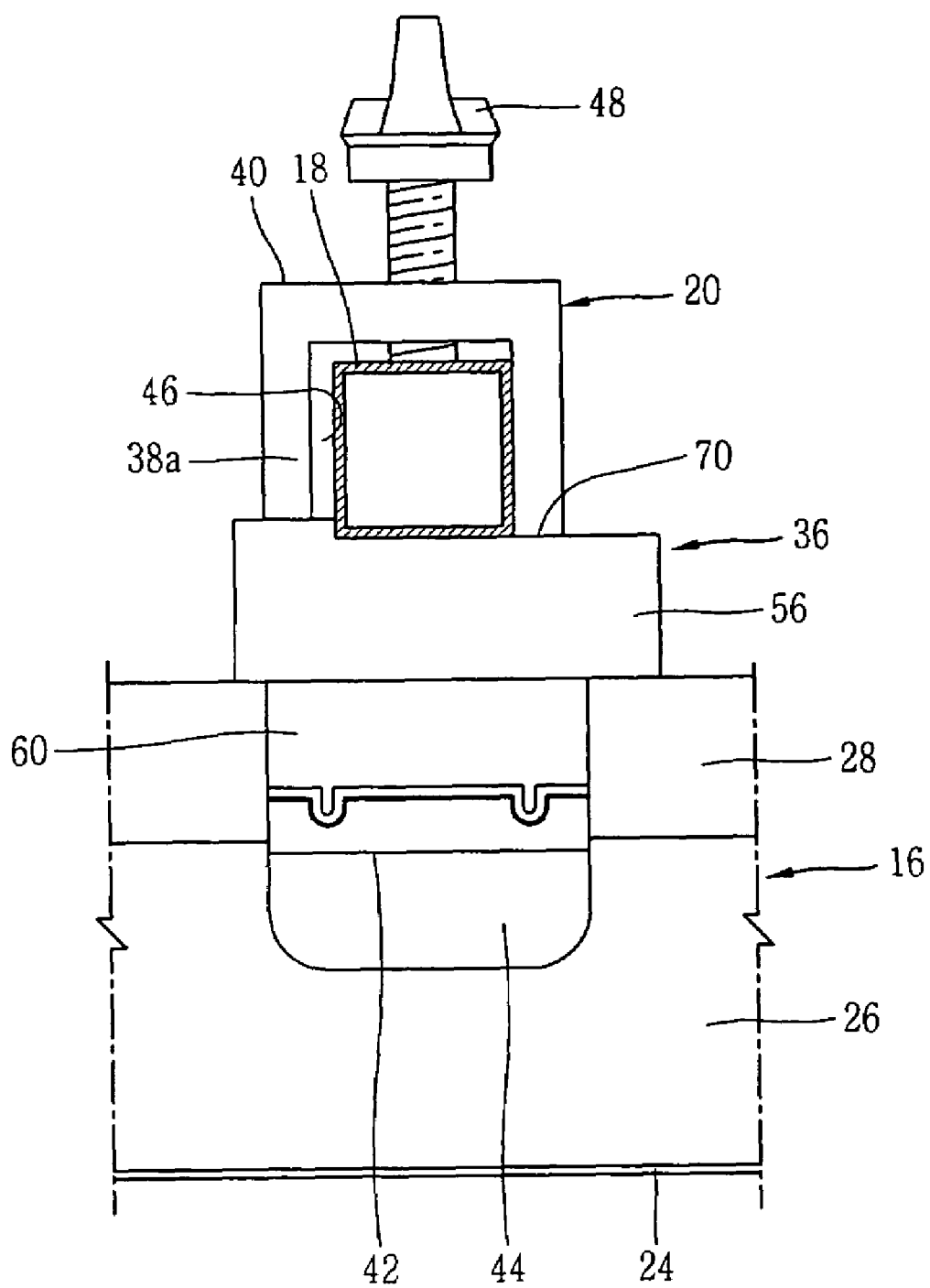
FIG. 3 is a side view showing a coupling state of the mounting device of the sprinkler in accordance with a first embodiment the present invention.

FIG. 1 is a perspective view showing that a sprinkler in accordance with the present invention is fixed to a ceiling by a mounting device of the sprinkler, FIG. 2 is an exploded perspective view of the mounting device of the sprinkler in accordance with the first embodiment the present invention, and FIG. 3 is a side view of the mounting device of the sprinkler in accordance with the first embodiment of the present invention;

The sprinkler in accordance with the present invention includes: a sprinkler reducer 10 fixed inside a ceiling 14; a sprinkler head (not shown) mounted at a lower end of the sprinkler reducer 10 and disposed to be exposed to the outside of the ceiling 14, for spraying of water for fire protection; and a water supply hose 12 connected to an upper end of the sprinkler reducer 10, through which water needed for fire protection is supplied.

The sprinkler reducer 10 is fixed to an inner side of the ceiling 14 by a mounting device of the sprinkler.

The mounting device of the sprinkler includes: a pair of support rails 16 fixed to an inner surface of the ceiling 14 parallel to each other; a support bar 18 fixed between the support rails 16; a mounter 20 for fixing the support bar 18 and the support rail 16 together; and a mounting bracket 22 for fixing the sprinkler reducer 10 to the support bar 18.

Here, the support rail 16 includes: a ceiling fixed portion 24 fixed to the inner surface of the ceiling 14; a rail portion 26 vertically extending from the ceiling fixed portion 24; and a mounter fixing portion 28 formed at an upper end of the rail portion 26, to which the mounter 20 is insertedly fixed.

A section of the mounter fixing portion 28 is formed as a quadrangular shape, so that a lower end of the mounter 20 is inserted in and caught by the mounter fixing portion 28.

The mounter 20 comprises: a main body 30; a rail mounting portion 32 formed at a lower portion of the main body 30 and inserted in the mounter fixing portion 28 of the support rail 16; a support bar fixing portion 34 formed at an upper portion of the main body 30, to which the support bar 18 is fixed; and a locking member 36 insertedly coupled to the main body 30 in a lateral direction of the main body 30, for preventing separation of the rail mounting portion 32 from the mounter fixing portion 28.

The main body 30 comprises: a pair of side plates 38a and 38b disposed parallel to each other at a distance (Q) wider than a width (P) of the mounter fixing portion 28 of the support rail 16; and an upper plate 40 formed at upper sides of the side plates 38a and 38b to connect the plates together.

The rail mounting portion 32 comprises: a stopping projection 42 formed by inward bending of lower ends of the side plates 38a and 38b, and inserted in and caught by the mounter fixing portion 28 of the support rail 16; and a contact portion 44 bent downward at both end portions of the stopping projection 42 and adherently attached to both sides of the rail portion 26 of the support rail 16.

The support bar fixing portion 34 comprises: a through hole 46 formed at a pair of side plates 38a and 38b, through which the support bar 18 penetrates; and a locking bolt 48 screw-coupled to a bolt coupling hole 50 formed at the upper plate 40, for locking the support bar 18 having penetrated through the through hole 46.

Here, the through hole 46 is formed as a quadrangular shape and has a width wider than that of the support bar 18, so that the support bar 18 can be easily inserted therein.

The locking member 36 prevents the lower end of the main body 20 from being spread, thereby preventing separation of the main body 20 from the support rail 16 and also preventing the support bar 18 penetrating the through hole 46 from being shaken from side to side.

Namely, the locking member 36 includes: a first plate 54 having a pair of slots 52a and 52b inserted in a pair of side plates 38a and 38b, respectively; second plates 56 vertically extending from both side surfaces of the first plate 54 and disposed outside the side plates 38a and 38b; and a third plate 58 vertically extending from a rear surface of the first plate 54.

The first plate 54 is inserted inside the main body 20. Then, its lower surface is attached to an upper surface of the mounter fixing portion 28 of the support rail 16, so that the main body 20 which has been insertedly coupled to the mounter fixing portion 28 is prevented from moving vertically.

Here, a groove 60 in which the slots 52a and 52b formed at the first plate 54 are inserted is formed at the side plates 38a and 38b to restrict a range within which the locking member 36 moves vertically. As the slots 52a and 52b are caught at the groove 60, the groove 60 restricts a range within which the locking member 36 can move vertically in a state of being inserted between the side plates 38a and 38b.

A reinforcement groove 62 for reinforcement of the side plate strength is formed at the side plates 38a and 38b.

Guide portions 64 which are enlarged inlets of the slots 52a and 52b formed at the first plate 54 are formed, so that the slots 52a and 52b can be inserted more conveniently into the grooves 60 of the side plates 38a and 38b.

A pair of second plates 56 are formed by being bent upward at both sides of the first plates 54 at a right angle, and a movement preventing projection 70 for preventing the support bar 18 inserted in the through hole 46 from moving from side to side is formed at an upper surface of the second plate 56.

Namely, the through hole 46 has a width wider than that of the support bar 18, so that the support bar 18 can be easily inserted therein. Accordingly, the support bar 18, which has been inserted in the through hole 46, moves from side to side. At this time, if a lower surface the support bar 18 is inserted in the movement preventing projection 70, the movement of the support bar 18 from side to side is prevented.

Figure 4:
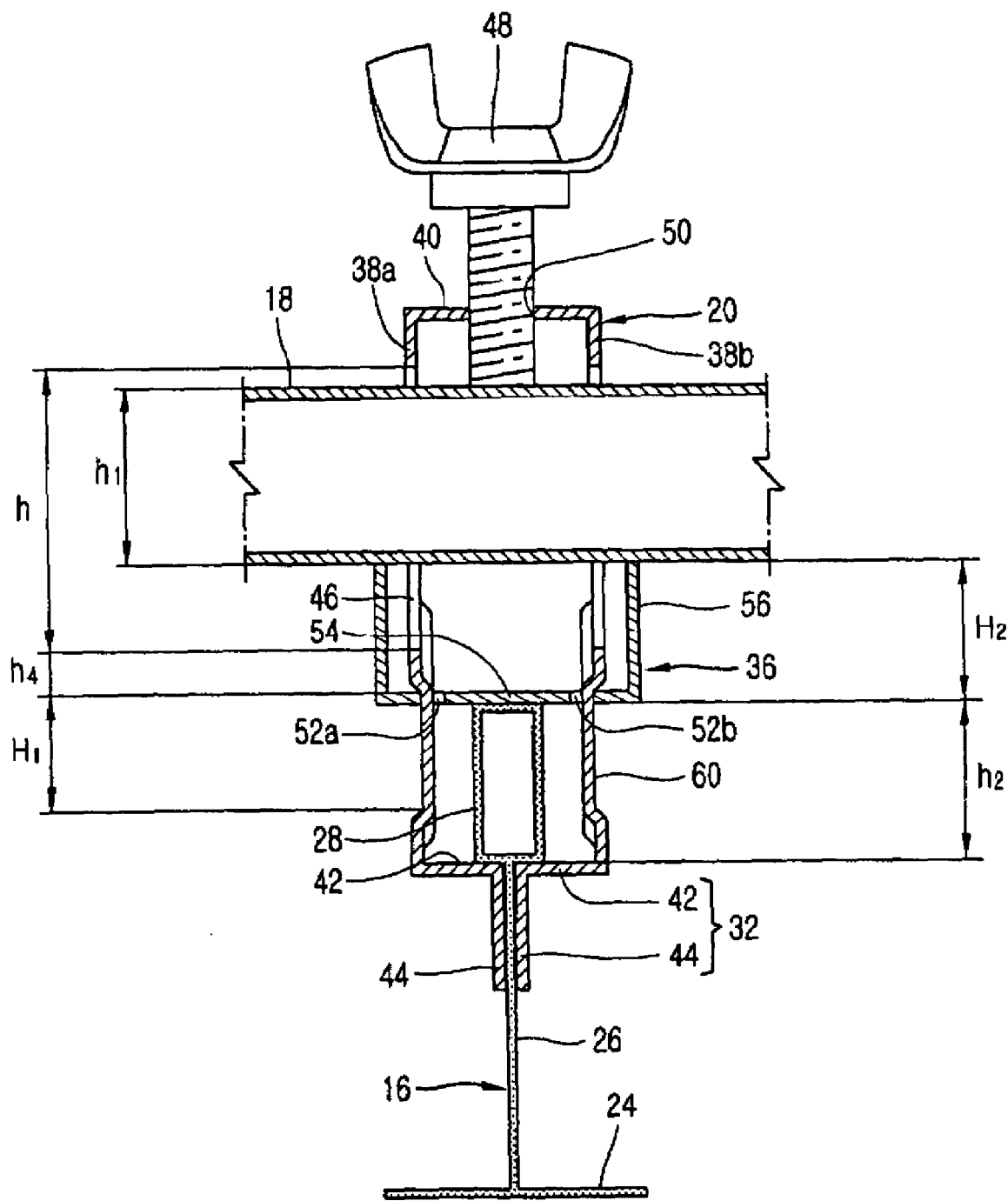
FIGS. 4 and 5 are sectional views of the mounting device of the sprinkler in accordance with a first embodiment of the present invention.
Figure 5:
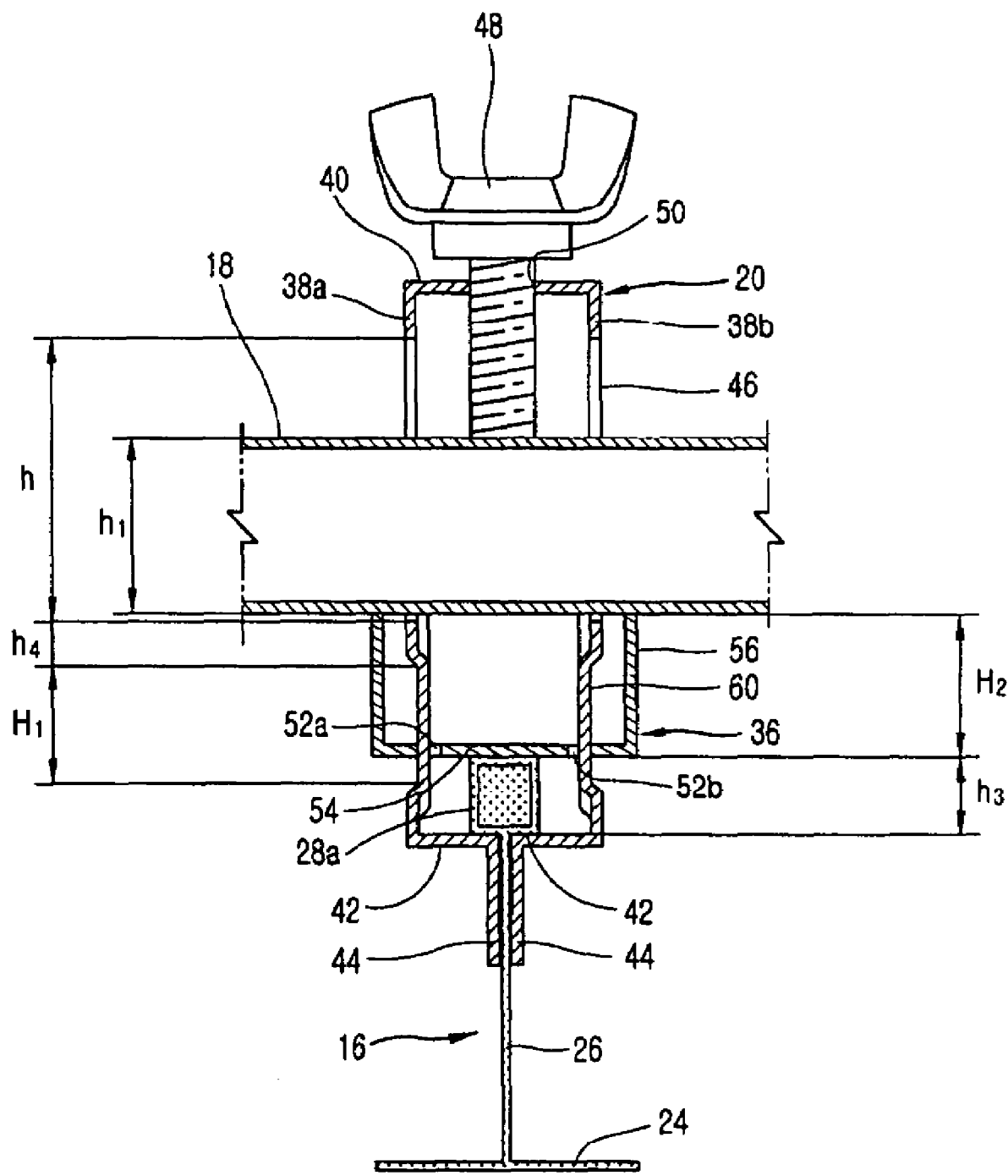

FIGS. 4 and 5 are sectional views of the mounting device of the sprinkler in accordance with the present invention.

On the assumption that a height of the through hole 46 is referred to as 'h', a height of the groove 60 'H1', a height of the second plate 56 of the locking member 70 'H2', a height of the support bar 18 'h1', the maximum height of mounter fixing portions 28 of various sized support rails 16 'h2', the minimum height of mounter fixing portions 28 of the support rails 16 'h3', and a height between the through hole 46 and the groove 60 'h4', it is set that h(height of through hole)=h1(height of support bar)+[h2(maximum height of mounter fixing portion)−h3(minimum height of mounter fixing portion)], it is set that H1(height of groove)=[h2(maximum height of mounter fixing portion)−h3(minimum height of mounter fixing portion), and it is set that H2(height of second plate)=[h2(maximum height of mounter fixing portion)−h3(minimum height of mounter fixing portion)]+h4(height between through hole and groove).

In substantial manufacturing thereof, it is preferably set that h>h1+(h2−h3), H1>(h2−h3), and H2>(h2−h3)+h4 with regard to tolerance.

The operation of the mounting device of the sprinkler in accordance with the present invention having such a structure will now be described.

First, a lower portion of the main body 20 is opened wide, and the mounter fixing portion 28 of the support rail 16 is inserted in the opened portion. And if the lower portion of the main body 20 is narrowed, the stopping projection 42 formed at the lower portion of the main body 20 is caught by the mounter fixing portion 28. And the support bar 18 is inserted in the through hole 46 of the main body 20.

In such a state, the locking member 36 is inserted in the groove 60 formed at the side plates 38*a* and 38*b* of the main body 20. Then, the first plate 54 is inserted inside the main body, and a pair of slots 52*a* and 52*b* formed on the first plates 54 are inserted in the side plates 38*a* and 38*b*.

At this time, a lower surface of the first plate 54 comes in contact with an upper surface of the mounter fixing portion 28 of the support rail 16, and an upper surface of the second plate 56 of the locking member 36 comes in contact with a lower surface of the support bar 18. And, the lower surface of the support bar 18 is caught by the movement preventing projection 70 formed at the upper surface of the second plate 56, so that a movement of the support bar 18 from side to side can be prevented.

In a state that the components are assembled together, a locking bolt 48 is threaded into the bolt coupling hole 50 formed at an upper plate 40 of the main body 20. As the locking bolt 48 is threaded therein, the support bat 18 moves downward and contacts with the upper surface of the second plate 56, and the first plate 54 of the locking member 36 is closely attached to the mounter fixing portion 28 of the support rail 28. In such a manner, the support bar 18 and the support rail 16 are coupled together.

Here, as shown in FIG. 4, in case that a height of a mounter fixing portion 28 of the support rail 16 is the maximum, the first plate 54 of the locking member 36 is placed above the groove 60 formed at the side plates 38*a* and 38*b*, and as shown in FIG. 5, in case that a height of a mounter fixing portion 28*a* of the support rail 16 is the minimum, the first plate 54 of the locking member 36 is placed at a lower side of the groove 60. Because a height of the locking member 36 is controlled vertically along the groove 60 according to heights of mounter fixing portions 28 and 28*a* of the support rail 16, the mounting device of the sprinkler can be applied to support rails 16 having different heights.

Figure 6:
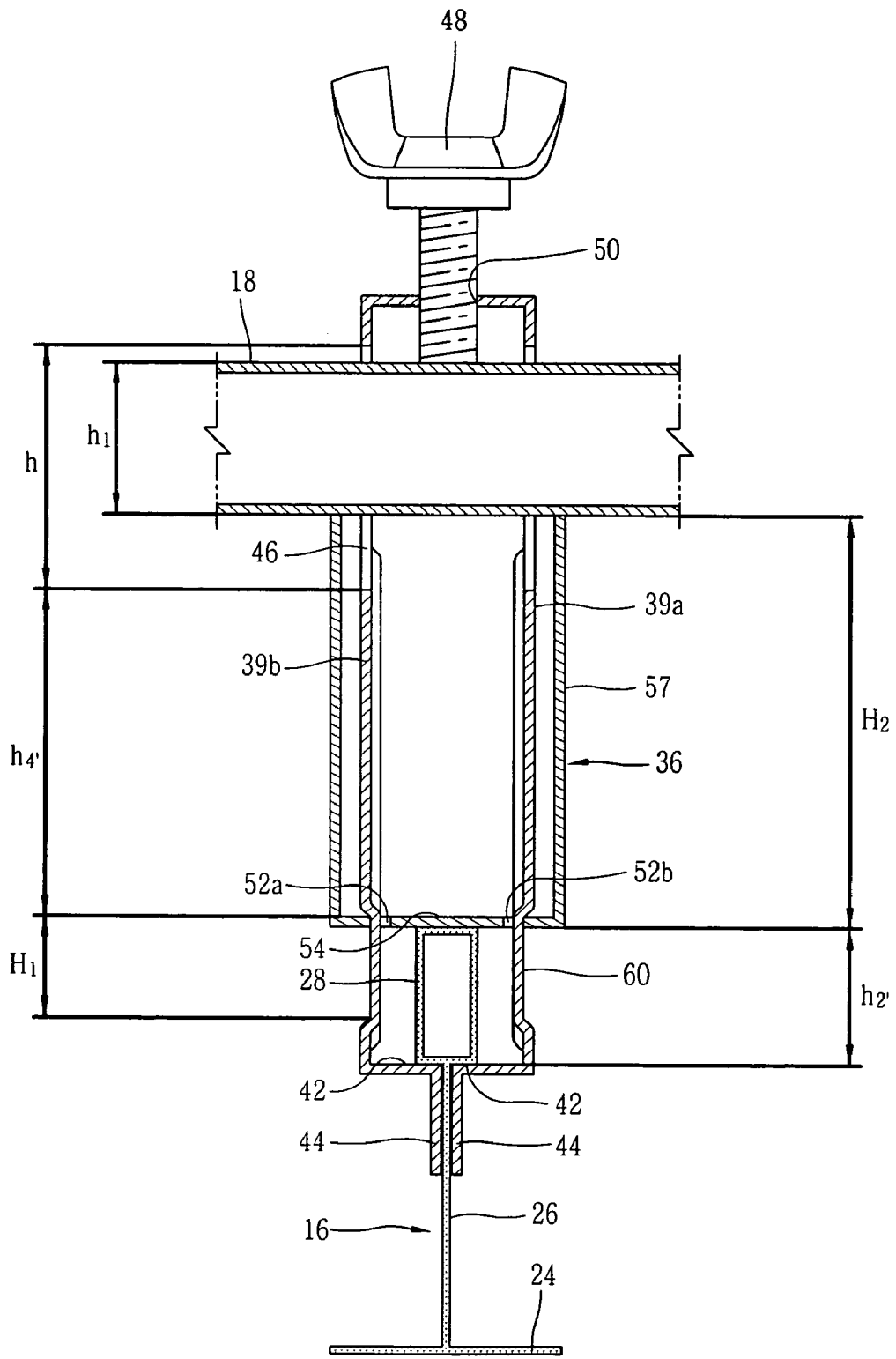
FIGS. 6 and 7 are sectional views of the mounting device of the sprinkler in accordance with a second embodiment of the present invention.
Figure 7:
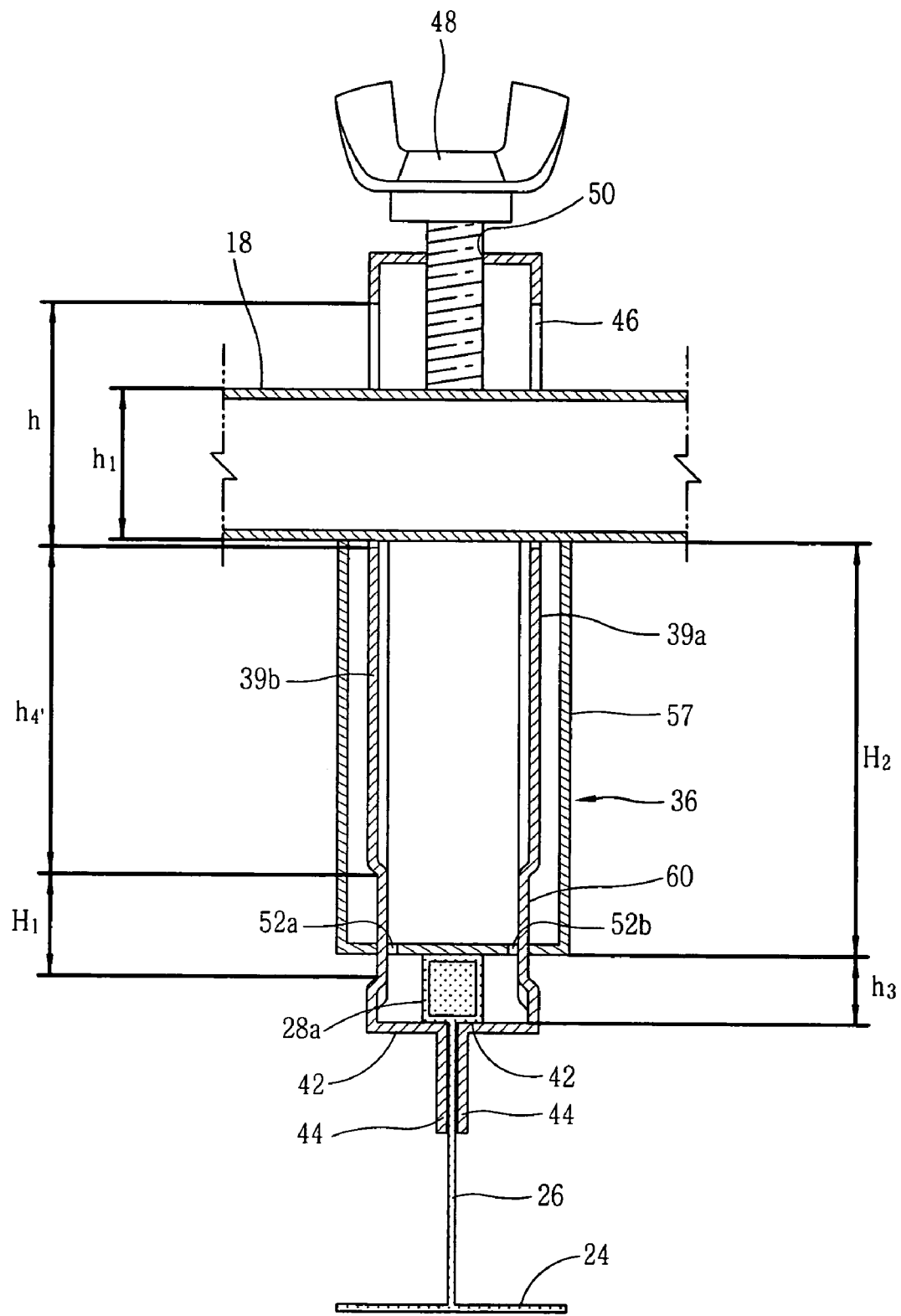

FIGS. 6 and 7 are sectional views of the mounting device of the sprinkler in accordance with a second embodiment of the present invention.

The mounting device of the sprinkler in accordance with the second embodiment is used when an interval between the ceiling 14 and the support bar 18 should be great because of a high sprinkler head. A structure thereof is the same as that of the mounting device of the sprinkler which has been explained in the first embodiment, except that a length of each side plate 39*a* and 39*b* of the main body 20 is longer, and a height of a second plate 57 of the locking member 36 is higher. Namely, an interval between the groove 60 and the through hole 46 formed at the side plate 39*a* and 39*b* is made to be great, thereby widening an interval between the ceiling 14 and the support bar 18.

In the mounting device of the sprinkler in accordance with the second embodiment having such a structure, height h4' between the through hole 46 and the groove 60 is higher than height h4 between the through hole 46 and the groove 60 of the first embodiment, and height h2' of the second plate 57 of the locking member 36 of the second embodiment is higher than height h2 of the second plate 56 of the locking member 56 of the first embodiment.

In the mounting device of the sprinkler in accordance with the present invention having such a structure, after the support rail and the support bar are assembled to the main body, the locking member is inserted in the main body, and then the locking bolt is threaded therein, thereby completing assembling. Accordingly, the mounting device of the sprinkler is advantageous in that an assembling operation is simple, the time taken to carry out the operation can be reduced, and it can be applied to various sized ceiling support rails and sprinklers.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mounting device of a sprinkler comprising: a pair of support rails fixed on a ceiling parallel to each other; a support bar fixed between the support rails; a mounter for fixing the support bar and the support rail together; and a mounting bracket for fixing the sprinkler reducer to the support bar, wherein the mounter comprises:
    a main body provided with a pair of side plates and an upper plate disposed on upper portions of the side plates;
    a rail mounting portion formed at lower ends of the side plates and insertedly fixed to the support rail;
    a support bar fixing portion formed at an upper side of the main body, for supporting the support bar; and
    a locking member inserted in the side plates in a lateral direction, for preventing the rail mounting portion from being separated from the support rail, wherein the locking member comprises a first plate having a pair of slots which are inserted in the respective side plates, and second plates extending vertically from both sides of the first plate for supporting a lower surface of the support bar.

2. The mounting device of claim 1, wherein the rail mounting portion comprises:
    a stopping projection bent inward at lower ends of the side plates, and inserted into and caught by the mounter fixing portion of the support rail; and
    a contact portion bent downward at both end portions of the stopping projection and coming in contact with both sides of a rail portion of the support rail.

3. The mounting device of claim 1, wherein the support bar fixing portion comprises:
    a through hole penetratingly formed at a pair of side plates, through which the support bar penetrates; and
    a locking bolt screw-coupled to a bolt coupling hole formed on the upper plate of the main body, for fixing the support bar having penetrated the through hole.

4. The mounting device of claim 1, wherein a third plate for reinforcement of the locking member is formed vertically at the rear of the first plate.

5. The mounting device of claim 1, wherein a guide portion for facilitating insertion of the slot into the side plate is formed at an inlet of the slot.

6. The mounting device of claim 1, wherein a groove to which the slot of the first plate is inserted is formed at the side plates.

7. The mounting device of claim 1, wherein a movement preventing projection at which a lower surface of the support bar is caught is formed at an upper surface of the second plate so that the support bar inserted in the through hole formed at the side plate is prevented from moving from side to side.

8. A mounting device of a sprinkler comprising:
- a main body including a pair of side plates having a through hole in which a support bar is inserted and a groove, and an upper plate disposed on the side plates;
- a rail mounting portion bent inward at lower ends of the side plates and fixed to a mounter fixing portion of a support rail;
- a locking bolt coupled to an upper plate of the main body, for fixing the support bar; and
- a locking member including a first plate having a pair of slots inserted into the groove of the side plates, and second plates extending upward from both sides of the first plate, the second plate for supporting a lower surface of the support bar.

9. The mounting device of claim 8, wherein the mounting device is substantially vertically oriented, wherein the mounter fixing portion has a height in a range defined between a maximum height and a minimum height, and wherein $h > h1 + (h2 - h3)$, $H1 > (h2 - h3)$, and $H2 > (h2 - h3) + h4$, where h denotes a height of the through hole, H1 denotes a height of the groove, H2 denotes a height of the second plate of the locking member, h1 denotes a height of the support bar, h2 denotes the maximum height of the mounter fixing portion, h3 denotes the minimum height of the mounter fixing portion, and h4 denotes a distance between the through hole and the groove.

* * * * *